Jan. 10, 1967

D. GABOR

Re. 26,138

IONIC VACUUM PUMPS

Original Filed Nov. 9, 1960

Inventor
DENNIS GABOR
By Cameron, Kerkam & Sutton
Attorneys

United States Patent Office

Re. 26,138
Reissued Jan. 10, 1967

26,138
IONIC VACUUM PUMPS

Dennis Gabor, London, England, assignor to Edwards High Vacuum International Limited, Crawley, England Original No. 3,118,077, dated Jan. 14, 1964, Ser. No. 68,183, Nov. 9, 1960. Application for reissue Jan. 4, 1966, Ser. No. 523,833
9 Claims. (Cl. 313—7)

Matter enclosed in heavy brackets [ ] appears in the original patent but forms no part of this reissue specification; matter printed in italics indicates the additions made by reissue.

This invention relates to ionic vacuum pumps in which the gas atoms or molecules are ionized by electronic impact, the ions being impelled by electric fields into contact with a getter material which removes them by absorption or adsorption.

Ionic vacuum pumps have been known for a long time in which electrons are made to oscillate between two electrodes at cathode potential which the electrons cannot reach, being prevented by a strong magnetic field from escaping sideways. Pumps of this type have been successfully embodied in sealed-off vacuum devices. Their disadvantage is the large weight of the permanent magnets, and also their strong magnetic stray field which prevents their application in electron-optical devices sensitive to magnetic fields, such as cathode ray tubes or electronic cameras.

This invention relates to an ionic vacuum pump in which the movements of the ionising electrons are governed by purely electrostatic fields in such a way that, at least for the most part, they do not land on the appropriate electrode unless they have collided with a gas molecule.

According to the invention an ion-getter pump comprises a box or outer electrode presenting a surface of gettering material and having a rotationally symmetrical wall, said electrode being adapted to be maintained at a negative potential to serve as an ion collector, an axial electrode lying on the axis of symmetry of said wall and adapted to be maintained at a positive potential to serve as an anode, and means comprising an electron gun for producing ionising electrons, said gun being positioned to direct an electron stream tangentially into the device, the arrangement being such that in operation the ionising electrons are caused to travel in extended paths within the space encircled by said rotationally symmetric wall without the aid of a magnetic field. In the use of the device, the space encircled by said rotationally symmetric wall is, of course, in communication with the space to be evacuated, the outer electrode operating as the cathode and the axial electrode as the anode. By "tangentially" is meant in a direction tangential to any rotationally symmetric surface centered on the axis of symmetry of the outer electrode and removed from the axis, that is to say between the axial electrode and the wall.

The device is operated with a potential difference between the outer and the axial electrodes high enough for ionization and producing a generally radial electric field between the electrodes. The potential of the outer electrode is equal to or lower than the potential of the cathode in the electron gun, so that electrons fired from the gun cannot land on any point of the outer electrode. They are also prevented from landing immediately on the positive axial electrode by their momentum, which carries them past the axial electrode and makes them orbit around it, under the influence of the electric field, until they strike a gas atom or molecule, the electrons being ultimately collected at the axial electrode. Positive ions produced by the electron stream will move to the outer electrode which is made of or coated with gettering material which permanently absorbs or adsorbs at least a considerable proportion of the atoms formed by the neutralization of the ions.

The invention has particular advantages for use in association with electronic devices such as cathode ray tubes and the like, in which voltages sufficiently high for the operation of the device are available, so that no separate supply is required. The invention is of special value in cathode ray devices such as projection tubes or colour tubes, in which gas development is strong owing to high-power operation, or to tubes containing complicated electrode structures or large metal walls which cannot be perfectly outgassed. Moreover, the invention makes it possible to embody in such devices insulating materials such as silicones for example, which could not otherwise be employed in sealed-off high vacuum devices, because of their tendency to release gas continuously.

The invention will be better understood from the following description given with reference to the accompanying drawings in which.

Figure 1:
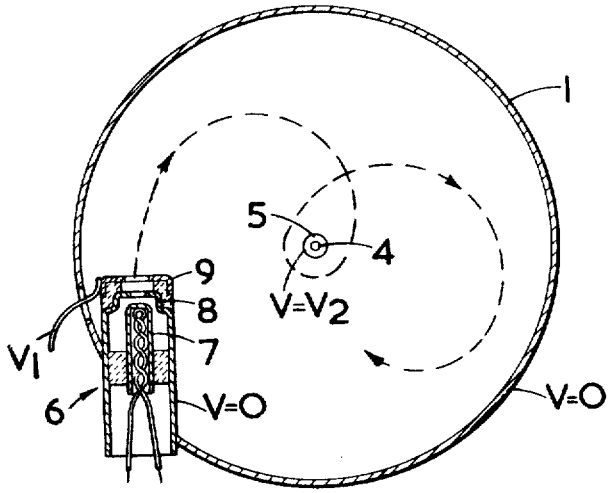
FIG. 1 is a plan section of an ionic vacuum pumping device according to the invention.
Figure 2:
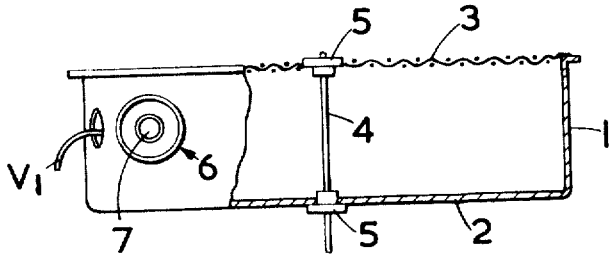
FIG. 2 is an axial section thereof.

In FIG. 1 the outer or negative electrode is in the form of a box having a cylindrical wall 1, and end-plates 2 and 3, the latter being made of metal gauze to give access to the gas in the vacuum envelope (not shown) which surrounds the structure. The axial or positive electrode or anode is a wire or rod 4, supported on but insulated from the end-plates by insulating bushes 5. An electron gun 6 comprising a hot cathode 7, a grid 8 and an apertured anode 9 is mounted in the wall 1 with its axis directed in a tangential direction at radius R from the axis of the wall 1. The grid 8 is preferably of cathode potential and the anode 9 is at a potential high enough to draw a sufficient electron current from the cathode, but preferably well below that of the anode 4. This choice of the potential arises from economy of power, and also from the requirement that the anode 9 shall not much disturb the rotational symmetry of the electric field inside the box.

A typical electron trajectory is indicated in FIG. 1 in dotted lines. It will be seen from this figure that the electrons (due to their momentum and the generally radial electric field between the outer and the axial electrodes) orbit around the axis in approximately cycloidal trajectories, and that the radius R of the imaginary cylindrical surface to which the axis of electron gun 6 is tangent is several times larger than the radius of the wire or rod anode 4. Let $V_1$ be the potential of the apertured anode 9; at the instant of leaving the aperture the electrons have an angular momentum around the axis proportional to $RV_1^{1/2}$, which they will preserve in their motion. Let r be the radius of the anode 4, and $V_2$ its potential. If $$R.V_1^{1/2} > r.V_2^{1/2}$$

no electron will be able to reach the wire 4, because the largest potential available in the device, which is $V_2$, will not be sufficient to make the right hand side equal to the left hand side at the radius r, hence the radius r will not be accessible.

As an example, if $V_2 = 10{,}000$ volts, $V_1 = 100$ volts, electrons will not be able to land on a wire with a radius r which is less than one-tenth of the initial radius R. In practice one must make an allowance for the disturbance of the rotational symmetry of the electrostatic field by the gun, and it is preferable to make the wire radius smaller than that given by the angular momentum condition. A lower limit is set by the heating of the wire 4, by the electron current to it due to electrons which have been in collision with gas molecules. This wire is therefore preferably made of tungsten or of titanium, or in the form of a helix surrounding a gettering material, which is gradually evaporated.

The device may, of course, differ from that shown in the above described example in a number of ways. Thus if the cylindrical wall of the outer electrode is deep enough in the axial direction the end walls need not be provided since there will be little likelihood of electrons or ions escaping, but it may be advantageous in any case to provide at least inturned flanges around the edges of the cylindrical wall. Alternatively the outer wall need not be cylindrical but could be of curved cross section so as to be shaped, for example, somewhat like a motor tyre, but preferably with a central opening rather small in relation to the maximum diameter of the electode. In such a case the axial electrode or anode may be supported independently of the outer electrode. The axial extent of the outer electrode and the provision or not of the end plates or flanges will depend in some measure upon the care with which the electron gun 7, 8, 9 is focussed and the divergence of electron paths from planes perpendicular to the axis of the outer electrode avoided.

*As shown in the drawings, the electron gun comprised in the means for producing ionizing electrons constitutes an electron source positioned to direct electrons emitted by said source tangentially as above defined in the space between said electrodes so that such electrons will be caused by the electric field in said space to travel in extended paths without the aid of an applied magnetic field. More particularly, as shown in FIG. 1, the electron gun comprises an electron emitting means shown as a hot cathode 7, which emits electrons in a more or less random fashion, and an electron directing means shown as the wall 6, grid 8, and apertured anode 9, for directing a greater proportion of the electrons emitted by the electron emitting means into the radial electric field with a sufficient component of velocity tangential to said field to cause them to travel therein in extended paths, than would be so directed if no directing means were present. As will also be appreciated by those skilled in the art, the presence of the directing means 6, 8, 9 in the radial electric field affects somewhat the contours of the system, and the terms radial electric field and rotationally symmetrical wall are to be understood accordingly. As will also be evident to those skilled in the art from the typical cycloidal trajectory shown in broken lines in FIG. 1, electrons entering such a trajectory at any position thereafalong with the angular velocity corresponding to the position of such entrance will follow such extended paths unless diverted therefrom by collision with a gas molecule.*

The walls of the outer electrode are preferably made of solid gettering metals, such as zirconium or titanium, or they are coated by evaporation, with getters such as barium. Though barium has a gettering effect also for neutral gases, it is known that barium getters soon go inert, and become practically inactive for gas pressures below a certain minimum, which fall far short of the requirements in cathode ray devices and the like. They become, however, active in the presence of ions. Experimentally it was found that even after long operating times the sticking factor in the device according to the invention well exceeded 10%, that is to say more than a tenth of the ions which struck the wall were permanently eliminated.

The pumping power of the device according to the invention is about 2 litres/sec. at $10^{-3}$ mm. pressure per milliampere of ion current if every ion is permanently removed and 200 cm.$^3$/sec. if the sticking ratio is 10%. At $10^{-5}$ mm. Hg, which is the minimum vacuum at which cathode ray devices can operate normally, these figures increase to 200 litres/sec. and 20 litres/sec. respectively. 200 litres/sec. is about as much as a gauze-covered end-plate of 6 cm. diameter can transmit; hence at even lower pressures the current can be reduced to about 100 microamperes, without loss of pump efficiency. Beam currents of this order can be taken from the high tension supply of television tubes and the like without having to increase the power packs beyond their normal size.

It is a particular advantage of the invention that the positive ion bombardment of the electron gun is small, even in bad vacua, because the radial electric field will drive most ions straight to the casing, instead of to the cathode. The life of the cathode of the pump is therefore likely to exceed that of the cathode in the main electron gun of the vacuum tube device with which it is associated.

I claim:

1. An ionic vacuum pumping device comprising an outer electrode having a surface of gettering material and a rotationally symmetric wall defining a space adapted to contain gas molecules, said electrode being adapted to be maintained at a negative potential to serve as an ion collector, a second electrode within said space adapted to be maintained at a positive potential to serve as an anode, and means for producing ionizing electrons, said means comprising an electron gun positioned to direct an electron stream tangentially into said outer electrode, whereby the electrons are caused to travel in extended paths within said space without the aid of a magnetic field.

2. An ionic vacuum pumping device comprising an outer electrode having a rotationally symmetric wall, an axially extending electrode lying on the axis of symmetry of said wall, and an electron gun positioned to direct an electron stream into said outer electrode in a direction tangential to an imaginary rotationally symmetric surface centred on said axis of symmetry and spaced from said axially extending electrode, said outer electrode having two end walls, substantially perpendicular to said axis of symmetry, one of said end walls being foraminous.

3. An ionic vacuum pumping device according to claim 1, in which said outer electrode includes a foraminous wall which affords communication with a space to be evacuated.

4. An ionic vacuum pumping device according to claim 1, in which said electron gun penetrates said rotationally symmetric wall and is positioned to direct an electron stream tangentially to an imaginary cylindrical surface centred on the axis of symmetry of said wall and nearer said wall than to said axis.

5. An ionic pumping device comprising an outer electrode having a rotationally symmetric wall, an axially extending rod electrode lying on the axis of symmetry of said wall, and an electron gun penetrating said rotationally symmetric wall and positioned to direct an electron stream tangentially to an imaginary cylindrical surface centred on the axis of symmetry of said wall and nearer to said wall than to said axis the radius of said imaginary cylindrical surface being several times larger than the radius of said axially extending electrode.

*6. An ionic vacuum pumping device comprising an outer electrode having a surface of gettering material and a rotationally symmetric wall defining a space adapted to contain gas molecules, said electrode being adapted to be maintained at a negative potential to serve as an ion collector, a second electrode within said space adapted to be maintained at a positive potential to serve as an anode so that a radial electric field is established between said outer electrode and said anode, and means for producing ionizing electrons comprising an electron source positioned to direct electrons emitted by said source tangentially with respect to said outer electrode whereby the electrons are caused by said radial electric field to travel in extended paths within said space notwithstanding that said device does not comprise means applying any strong magnetic field across said space.*

*7. An ionic vacuum pumping device comprising an outer electrode having a surface of gettering material and embracing a space adapted to contain gas molecules, said outer electrode being maintained at a negative potential during use to serve as an ion collector, a second*

*electrode within said space which is maintained at a positive potential during use to serve as an anode with said negative and positive potentials establishing a radial electric field in the space between said electrodes, and means for directing ionizing electrons into said space with a sufficient component of velocity tangent to said radial electric field to cause said electrons to travel about said second electrode in extended paths within said space notwithstanding that said device does not comprise means applying any strong magnetic field across said space.*

*8. An ionic vacuum pumping device comprising an outer electrode having a surface of gettering material and embracing a space adapted to contain gas molecules, said outer electrode being maintained at a negative potential in use to serve as an ion collector, a second electrode within said space which is maintained at a positive potential in use to serve as an anode with said negative and positive potentials establishing a radial electric field in the space between said electrodes, and means for producing ionizing electrons including an electron gun comprising an electron emitter and means for directing electrons emitted by said emitter into said space with components of velocity tangent to said field such that the*

*said electrons are caused by the said radial electric field to travel in extended paths within said space nothwithstanding that said device does not comprise means applying any strong magnetic field across said space.*

*9. An ionic vacuum pumping device according to claim 6 wherein said second electrode comprises a supply of gettering material which is adapted to be gradually evaporated by heating of said second electrode by the electron current to it due to electrons which have been in collision with gas molecules.*

References Cited by the Examiner

The following references, cited by the Examiner, are of record in the patented file of this patent or the original patent.

UNITED STATES PATENTS

| | | | |
|---|---|---|---|
| 2,528,541 | 11/1950 | Pajes | 313—62 X |
| 2,689,918 | 9/1954 | Youmaus | 313—61 |
| 2,925,214 | 2/1960 | Gurewitsch | 230—69 |

JAMES W. LAWRENCE, *Primary Examiner.*

V. LAFRANCHI, *Assistant Examiner.*